United States Patent [19]

Beyer et al.

[11] Patent Number: 4,748,075

[45] Date of Patent: May 31, 1988

[54] FLAT SEALING MATERIAL MADE OF A SOFT SUBSTANCE, PARTICULARLY FOR THE PRODUCTION OF GASKETS THAT ARE TO BE SUBJECTED TO HIGH STRESSES

[75] Inventors: Horst Beyer; Hans-Rainer Zerfass, both of Burscheid; Heribert Bechen, Cologne; Hans Haack, Bad Berneck; Franz Kutnar, Bayreuth, all of Fed. Rep. of Germany

[73] Assignees: Goetze AG, Burscheid; Frenzelit Asbestwerke GmbH & Co. KG, Bad Berneck, both of Fed. Rep. of Germany

[21] Appl. No.: 527,948

[22] Filed: Aug. 30, 1983

[30] Foreign Application Priority Data

Aug. 30, 1982 [DE] Fed. Rep. of Germany ....... 3232255

[51] Int. Cl.$^4$ .............................................. B65D 53/00
[52] U.S. Cl. ..................................... 428/221; 162/145; 277/235 B; 277/DIG. 6; 428/288
[58] Field of Search ............... 428/288, 283, 323, 402, 428/221; 162/145, 181.1, 181.6; 277/235 A, 235 B, DIG. 6

[56] References Cited

U.S. PATENT DOCUMENTS

| 4,201,804 | 5/1980 | Stecher et al. | 277/235 B |
| 4,225,383 | 9/1980 | McReynolds | 162/145 |
| 4,245,689 | 1/1981 | Grard et al. | 162/145 |
| 4,271,228 | 6/1981 | Foster et al. | 428/281 |
| 4,279,696 | 7/1981 | Piersol | 162/146 |
| 4,317,575 | 3/1982 | Cavicchio | 277/227 |
| 4,373,992 | 2/1983 | Bondoc | 162/145 |
| 4,443,517 | 4/1984 | Shah | 428/285 |

FOREIGN PATENT DOCUMENTS

| 27706 | 4/1981 | European Pat. Off. . |
| 2730588 | 1/1978 | Fed. Rep. of Germany . |
| 2047298 | 11/1980 | United Kingdom . |

Primary Examiner—James J. Bell
Attorney, Agent, or Firm—Spencer & Frank

[57] ABSTRACT

A soft gasket material comprising an asbestos-free fiber material containing fibers and an organic binder, the soft gasket material being comprised of a fiber sheet containing at least three different intermixed types of fibers, namely (a) natural organic fibers, (b) synthetic organic fibers, and (c) at least one fiber type selected from mineral fibers and metal fibers, and being additionally comprised of powdered to finely fibrous fillers and at least one organic binder.

14 Claims, No Drawings

FLAT SEALING MATERIAL MADE OF A SOFT SUBSTANCE, PARTICULARLY FOR THE PRODUCTION OF GASKETS THAT ARE TO BE SUBJECTED TO HIGH STRESSES

BACKGROUND OF THE INVENTION

The present invention relates to a sealing material made of a soft substance, particularly for the production of gaskets that are to be subjected to high stresses, such as cylinder head gaskets, exhaust flange seals and the like for internal-combustion engines. The gasket comprises an asbestos-free, possibly metal reinforced, fiber sheet including fibers of synthetic or natural, organic and inorganic origin, with the fiber sheet possibly being impregnated with synthetic organic substances which, in their final state are plastically deformable or elastically cross-linked.

In practice, conventional cylinder head gaskets made of a soft substance for use in internal-combustion engines are usually made of possibly metal reinforced asbestos fiber sheets. These may be impregnated, for example, as disclosed in DE-AS No. 2,304,558 and corresponding U.S. Pat. No. 4,201,804 to Stecher et al, with a substance which, in its final state, is plastically deformable or elastically cross-linked.

With respect to their physical and chemical characteristics, asbestos fibers are the ideal material for the production of fiber sheet plates for cylinder head gaskets. It is known that asbestos fibers are heat resistant and sufficiently soft and elastically deformable. Moreover, asbestos fibers can be processed into fiber sheet materials in processes similar to those used in the production of paper so as to exhibit deformability, strength, porosity and stability suitable for use in cylinder head gaskets. On the other hand, asbestos fibers and asbestos dust are known to be a great health hazard so that it is to be expected that in the future the use of asbestos will be restricted considerably and most likely even entirely forbidden for the manufacture of certain products.

It has therefore been attempted to produce soft material gaskets of fiber sheets on the basis of inorganic or organic natural or synthetic fibers. Since the prior art fibers alone do not simultaneously possess all of the ideal physical characteristics of asbestos, it has been attempted, for example as disclosed in German Pat. No. 2,914,173, to produce fiber sheet materials for cylinder head gaskets by combining mixtures of two different types of fibers, namely natural organic fibers on the one hand and synthetic organic or inorganic fibers on the other hand. For example, according to DE-OS No. 2,730,588, the fiber panels intended, in particular, for the production of floor coverings, sealing plates or wall coverings are made of 40 to 60% vegetable fiber, 10 to 30% latex binders and 10 to 50% fine-grained mineral fillers.

However, cylinder head gaskets made of these combinations of materials for internal-combustion engines are not fully satisfactory and, with respect to the required, quite specific technolgoical properties, such gaskets are inferior to the previously employed cylinder head gaskets made of asbestos fiber sheets. For example, the plate material according to DE-OS No. 2,730,588 in particular did not exhibit the great strength and heat resistance required for cylinder head gaskets. Further, the plate material according to DE-OS No. 2,730,588, as well as the material according to DE-PS No. 2,914,173, could not be compressed sufficiently to the required density or porosity, respectively, so that subsequently the material could no be impregnated sufficiently.

SUMMARY OF THE INVENTION

It is therefore an object of the present invention to provide an asbestos-free soft gasket material which is particularly well suited for the manufacture of gaskets that are to be subjected to high stresses, such as cylinder head gaskets, exhaust flange seals and the like for internal-combustion engines.

Another object of the present invention is to provide such a gasket material from which the gaskets made of the novel gasket material have approximately the same technological characteristics as prior art gaskets based on asbestos fibers. In particular, such gaskets are to be able to be impregnated to the desired degree of pore fill with substances which, in their final state, are plastically deformable or elastically cross-linked.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a soft gasket material comprising an asbestos-free fiber material containing fibers and an organic binder, the soft gasket material being comprised of a fiber sheet containing at least three different intermixed types of fibers, namely (a) natural organic fibers, (b) synthetic organic fibers, and (c) at least one fiber type selected from mineral fibers and metal fibers, and being additionally comprised of powdered to finely fibrous fillers and at least one organic binder.

The fiber sheet may contain primarily metal fibers.

It is to be understood that both the foregoing general description and the following detailed description are exemplary and explanatory, but are not restrictive of the invention.

DETAILED DESCRIPTION OF THE INVENTION

Preferably, the fiber sheet of the sealing plate includes 15 to 60 weight percent fiber components, 30 to 70 weight percent powdered and/or finely fibrous fillers and 3 to 15 weight percent organic binders.

The fiber component of the fiber sheet is preferably comprised of 5 to 40 weight percent synthetic organic fibers, 5 to 25 weight percent natural organic fibers, possibly preprocessed chemically or physically, and 35 to 90 weight percent mineral fibers and/or metal fibers. The volume proportion of the fibers in the fiber sheet should preferably be at least 30 volume percent, this before any possibly required combination with a metal reinforcement in the form of a metallic carrier plate, and before the required final compression.

In the fiber sheet, at least 10% of the fibers should be suitable to form a sheet-of-paper-like structure when processed in a paper or cardboard manufacturing process—if they are used alone. Preferably, such fibers are possibly chemically and/or physically preprocessed vegetable fibers and/or synthetic organic fibers which have possibly been preprocessed by way of fibrillation.

Preferred synthetic organic fibers are heat-resistant polyamide, polyaramid and/or polyacrylonitrile fibers and possibly also carbon fibers.

The mineral fiber which can be employed in the present invention can be fibers which have been preprocessed by means of a chemical or physical procedure, for example, to improve adherence.

Preferred mineral fibers are primarily rock wool fibers, glass wool fibers, slag wool fibers and/or aluminum silicate fibers, whose surfaces have possibly been made particularly adhesive by means of chemical processes, such as, with preference, silanation.

Preferred metal fibers are at least one fiber type selected from high-grade steel fibers, fibers of unalloyed steel, weakly alloyed steel, copper, aluminum, bronze or brass.

The powdered fillers are preferably of inorganic origin and include kaolin, porcelain earth, heavy spar, talcum, gypsum, chalk, titanium dioxide, silicon dioxide, calcium silicate, ground slag, diatomaceous earth and/or powdered metal.

The finely fibrous fillers are preferably ground mineral fibers of a length less than 0.4 mm. The ground mineral fibers can be made from the mineral fibers described above, that is, from rock wool fibers, glass wool fibers, slag wool fibers, and/or aluminum silicate fibers.

The natural organic fibers employed may be of animal or vegetable origin. Cotton, cellulose or animal wool are particularly preferred natural organic fibers. The chemical preprocessing of the vegetable fibers is effected, in particular, in sulfurization processes, and the physical preprocessing is preferably effected in grinding processes which cause fibrillation of the fibers.

The fiber lengths of the natural organic fibers and of the synthetic organic fibers are preferably between 0.5 and 6 mm, while the lengths of the mineral and metal fibers preferably are between 0.5 and 4 mm.

The fiber sheets preferably are produced by forming aqueous suspensions of the fiber, filler and binder mixtures, and then employing these suspensions in paper and cardboard manufacturing machines, and this in such a manner that the pore volume of the dried fiber sheet is at least 10 volume percent. These fiber sheets can then be rolled, onto one or both sides, of the carrier element, which can be provided in the form of a roughened metal sheet.

It is of course also within the scope of the present invention to initially separately cut out the outlines of the gaskets and to join them together in a further process step. The resulting pore volume of the fiber sheet after the rolling process should be between 10 and 60 volume percent. The finished, cut-out gaskets, which may possibly have been provided with collars or U-shaped metal casings at their passage openings, can then be impregnated, preferably with cross-linkable, synthetic organic media and subsequently the impregnating agent is, preferably thermally, cross-linked to reach a plastically deformable or elastic final state.

It is also within the scope of the present invention, however, to produce the gaskets by processing the mixtures of fibers, fillers and binders, possibly with the addition of 10 to 50% cross-linkable liquids, into spreadable or injection-moldable masses, and then forming these masses into the finished gasket, including the carrier elements, by means of rollers or injection-molding machines.

Gaskets produced in the above manners were examined by measuring their operational behavior, particularly with respect to suitability for use as cylinder head gaskets. In addition, the cylinder head gaskets produced in these ways are tested in engines. The results of these tests show that the soft gasket material according to the present invention, in its impregnated as well as in its nonimpregnated form, is equivalent to the prior art gaskets produced with asbestos fibers.

The present invention has thus produced an asbestos-free soft gasket material which is suitable primarily for the production of cylinder head gaskets and similarly stressed seals such as, for example, exhaust flange seals.

It is here significant for the present invention that at least three different types of fibers having different physical and chemical properties are used for the fiber sheet. The natural organic fibers employed are primarily responsible for the formation of a solid, paper-like fiber sheet, the synthetic organic fibers evidently impart the necessary elastic deformability to the fiber sheet and the use if metal fibers and/or mineral fibers in conjunction with the fillers produces the required high heat resistance so that these physical and chemical properties in combination are added to those of the previously used asbestos fibers. The mineral fillers simultaneously provide good deformability of the plates to the desired density and porosity so that the plates can be impregnated to the required degree of pore fill.

Likewise important for the invention is the production of the soft material from the disclosed defined quantities of fiber, filler and binder. The quantity ratios, volume ratios and fiber lengths employed according to the present invention have made it possible to give the fiber sheet a sheet-of-paper-like structure and primarily to simultaneously make the fiber sheets sufficiently strong, heat resistant, and elastic or compressible, respectively.

The use of filler materials is significant here. It has been found that only if the fillers are used in the ratio of filler to fiber according to the present invention will the soft material be compressible in an optimum manner with little force by rolling or pressing to provide the desired pore volume or pore diameter. Compared to the prior art soft materials made of asbestos-free fiber sheets, the compressive forces are substantially lower, thus preventing excessive swelling of the material after compression.

Preferred compositions for the fiber sheets according to the present invention are set forth in the following three examples.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

A starting mixture is prepared which includes:
15% polyaramid having an average fiber length of 2 mm,
10% sulfate cellulose having an average fiber length of 3 mm,
35% rock wool having an average fiber length of 2 mm,
35% silicon carbide as filler,
5% NBR latex as binder.

The starting mixture is formed into a suspension, and from the suspension, fiber sheet plates are produced which have an area weight of 1000 g/m$^2$. These plates are combined with a rough metal sheet to form soft sealing plates. The plate is subsequentially impregnated, according to the teachings in the specification of DE-AS No. 2,304,558 and corresponding U.S. Pat. No. 4,201,804, which are incorporated herein by reference, with a cross-linkable, synthetic organic material which, in its final state, is plastically deformable or elastically cross-linkable, and the impregnant is a liquid polybutadiene with a molecular weight of about 1500

Water tightness and compressibility of the finished sealing plates are measured. The impregnated plates, as well as the nonimpregnated plates, exhibit values which make them suitable for the production of cylinder head gaskets.

EXAMPLE 2

A starting mixture is prepared which includes:
10% polyaramid (fiber length 2 mm)
5% polyacrylonitrile (fiber length 2 mm)
8% cotton (fiber length 3 mm)
7% sulfate cellulose (fiber length 3 mm)
20% rock wool (fiber length 2 mm)
20% silicon dioxide (maximum grain size 0.1 mm)
23% porcelain earth (maximum grain size 0.1 mm)
7% NBR latex as binder Sealing plates are produced from the above mixture according to the technique described in Example 1. The so obtained sealing plates have measured technological values which indicate suitability of the material for the production of cylinder head gaskets.

EXAMPLE 3

The starting mixture includes:
20% polyaramid (fiber length 2 mm)
10% cotton (fiber length 3 mm)
20% rock wool (fiber length 2 mm)
25% mica (maximum grain size 0.1 mm)
15% heavy spar (maximum grain size 0.1 mm)
10% NBR latex as binder Sealing plates are produced from the above mixture according to the technique of Example 1. The so obtained sealing plates exhibit values which make them suitable for the production of cylinder head gaskets.

It will be understood that the above description of the present invention is susceptible to various modifications, changes and adaptations, and the same are intended to be comprehended within the meaning and range of equivalents of the appended claims.

What is claimed is:

1. In an internal combustion cylinder head gasket the improvement comprising an asbestos-free soft gasket material having the characteristics of strength, heat resistance, and elasticity required for use as an internal combustion engine cylinder head gasket and containing fibers and an organic binder, comprising a fiber sheet consisting essentially of at least three different intermixed types of fibers, namely
    (a) natural organic fibers,
    (b) synthetic organic fibers, and
    (c) at least one type of fiber selected from mineral fibers and metal fibers, and
containing at least one inorganic filler selected from the group of powders consisting of kaolin, porcelain earth, heavy spar, talcum, gypsum, chalk, titanium dioxide, silicon dioxide, calcium silicate, powdered metal, ground slag, diatomaceous earth and ground mineral fibers, the ground mineral fibers being at least one ground fiber of rock wool, glass wool, slag wool or aluminum silicate or fine fibers having lengths of less than 0.4 mm and containing at least one organic binder.

2. The internal combustion engine cylinder head gasket of claim 1, wherein the fiber component comprises 5 to 40% by weight synthetic organic fibers, 5 to 25% by weight natural organic fibers, and 35 to 90% by weight of at least one fibers selected from mineral fibers and metal fibers.

3. The internal combustion engine cylinder head gasket of claim 1, wherein the volume percentage of fibers in the fiber sheet is at least 30%.

4. The internal combustion engine cylinder head gasket of claim 1, wherein at least 10% of the natural organic fibers and synthetic organic fibers are fibers which are suitable to be formed into sheets in a paper or cardboard producing process.

5. The internal combustion engine cylinder head gasket of claim 4 wherein the fibers suitable to be formed into sheets comprise fibers preprocessed by fibrillation selected from natural organic fibes and synthetic organic fibers.

6. The internal combustion engine cylinder head gasket of claim 1, wherein the synthetic organic fibers are at least one fiber type selected from polyamide, polyaramide, polyacrylonitrile or carbon fibers.

7. The internal combustion engine cylinder head gasket of claim 1, wherein the mineral fibers are at least one fiber type selected from rock wool fibers, glass wool fibers, slag wool fibers and aluminum silicate fibers.

8. The internal combustion engine cylinder head gasket of claim 1, wherein the natural organic fibers are at least one fiber selected from cellulose, cotton and animal wool.

9. The internal combustion engine cylinder head gasket of claim 1, wherein the natural organic fibers are processed by at least one method selected from chemical preprocessing by sulfurization or physical preprocessing by grinding.

10. The internal combustion engine cylinder head gasket of claim 1, wherein the fiber length of the natural organic fibers and of the synthetic organic fibers is between 0.5 and 6 mm.

11. The internal combustion engine cylinder head gasket of claim 1, wherein the fiber length of the mineral fibers is between 0.5 and 4 mm.

12. The internal combustion engine cylinder head gasket of claim 1, wherein the fiber sheet comprises metal fibers.

13. The internal combustion engine cylinder head gasket of claim 1, wherein the fiber sheet comprises 15 to 60% by weight fibers, 30 to 70% by weight of at least one inorganic filler selected from inorganic powders and inorganic fine fibers having lengths of less than 0.4 mm, and 3 to 15% by weight organic binders.

14. Soft gasket material as defined in claim 5, wherein the fibers selected from natural organic fibers and synthetic organic fibers have been preprocessed to cause fibrillation.

* * * * *